(12) United States Patent
Bhartia et al.

(10) Patent No.: US 10,299,167 B2
(45) Date of Patent: May 21, 2019

(54) SYSTEM AND METHOD FOR MANAGING DATA TRANSFER BETWEEN TWO DIFFERENT DATA STREAM PROTOCOLS

(71) Applicant: Cisco Technology, Inc., San Jose, CA (US)

(72) Inventors: Apurv Bhartia, San Mateo, CA (US); Feng Wang, Fremont, CA (US); Derrick Pallas, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 106 days.

(21) Appl. No.: 15/658,197

(22) Filed: Jul. 24, 2017

(65) Prior Publication Data

US 2018/0338269 A1 Nov. 22, 2018

Related U.S. Application Data

(60) Provisional application No. 62/506,834, filed on May 16, 2017.

(51) Int. Cl.
*H04W 28/10* (2009.01)
*H04L 12/801* (2013.01)
*H04W 28/02* (2009.01)
*H04W 84/12* (2009.01)

(52) U.S. Cl.
CPC .......... *H04W 28/10* (2013.01); *H04L 47/193* (2013.01); *H04W 28/0289* (2013.01); *H04W 84/12* (2013.01)

(58) Field of Classification Search
CPC . H04W 28/02; H04W 28/10; H04W 28/0289; H04W 284/12; H04L 47/10; H04L 47/12; H04L 47/193; H04L 1/1607; H04L 1/1854; H04L 1/187; H04L 69/16; H04L 69/161; H04L 69/163
See application file for complete search history.

(56) References Cited

U.S. PATENT DOCUMENTS

| | | | | |
|---|---|---|---|---|
| 2005/0041582 | A1* | 2/2005 | Hancock | H04L 43/00 370/231 |
| 2008/0037420 | A1* | 2/2008 | Tang | H04L 1/1607 370/229 |
| 2010/0020689 | A1* | 1/2010 | Tang | H04L 47/10 370/235 |
| 2014/0334296 | A1* | 11/2014 | Waclawsky | H04L 47/12 370/230 |
| 2015/0143505 | A1* | 5/2015 | Border | H04L 12/4641 726/15 |

(Continued)

*Primary Examiner* — Hoang-Chuong Q Vu
(74) *Attorney, Agent, or Firm* — Polsinelli PC

(57) ABSTRACT

Disclosed is a method includes treating, at an access point, a data flow between a first station and a second station during a first period of time as a non-fast flow. After a condition is met, the method includes marking the data flow as a fastACK flow during a second period of time and during the second period of time, storing data frames in the data flow at the access point to yield stored data frames. Next, the method includes generating a spoofed TCP acknowledgment signal on behalf of the first station and associated with the stored data frames and transmitting the spoofed TCP acknowledge signal to the second station.

20 Claims, 7 Drawing Sheets

(56) References Cited

U.S. PATENT DOCUMENTS

2015/0163142 A1\* 6/2015 Pettit ................... H04L 47/125
  370/230
2017/0034060 A1\* 2/2017 Patel .................... H04L 1/1607
2017/0230447 A1\* 8/2017 Harsha ................. H04L 49/109

\* cited by examiner

SYSTEM AND METHOD FOR MANAGING DATA TRANSFER BETWEEN TWO DIFFERENT DATA STREAM PROTOCOLS

RELATED APPLICATIONS

This application claims priority to U.S. Provisional Application No. 62/506,834 filed on May 16, 2017, entitled "SYSTEM AND METHOD FOR MANAGING DATA TRANSFER BETWEEN TWO DIFFERENT DATA STREAM PROTOCOLS," the contents of which is incorporated herein by reference in its entirety.

TECHNICAL FIELD

The present disclosure relates to the Wi-Fi (802.11) protocol and more particularly to an improved interaction between 802.11 wireless streams and transmission control protocol (TCP) streams by reducing perceived packet latency at the sender and improving aggregation of packets into frames.

BACKGROUND

The transmission control protocol (TCP) is the most common protocol on the Internet. It relies on acknowledgment signals (ACKs) to estimate how quickly a sender can transmit without loss and treats packet latency as an indicator for loss. The wireless protocol 802.11ac is the most common wireless access protocol. The TCP protocol does not generally work well with the newer and faster wireless protocols such as 802.11ac. For wireless to achieve such high speeds, such as 1.3 Gbit/s, the 802.11 protocol relies on aggregation of packets in a frame. TCP however does not understand and is not configured to necessarily work well with the aggregation component of 802.11. The acknowledgement structure in TCP and the latency that is introduced because devices must contend for the wireless channel to send a TCP ACK can ultimately lead to devices aggregating less packets for a frame to transmit on the wireless channel, which reduces the efficiency of the system.

Access to the wireless medium (the radio link) according to the 802.11 protocol is controlled by coordination functions. One such function is the distributed coordination function (DCF) which requires stations to first check to see if the radio link is clear before transmitting data. To avoid collisions, stations use a random backoff after each frame is transmitted with the first transmitter seizing the channel. The DCF allows multiple independent stations to interact without central control. Before attempting to transmit, each station checks whether the wireless medium is idle. If the wireless medium is not idle, stations defer to each other and employ an orderly exponential backup algorithm to avoid collisions.

There are basic rules that apply to transmissions using the DCF. Those of skill in the art will understand the details of these rules. For purposes of this disclosure, it is simply noted that medium access is expensive in this environment, so once a device gains access to the radio link, it will desire to send as much data as possible. Accordingly, the device or system will intentionally induce packet latency in order to aggregate packets into a single frame. In another aspect, a sending device may aggregate less packets than it could because it has access to the wireless channel and wants to send something. The goals of introducing latency as well as aggregating packets into a single frame are fundamentally at odds with one another. Furthermore, the medium access process introduces additional, irregular latency into the use of ACKs, which only exacerbates the issue.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
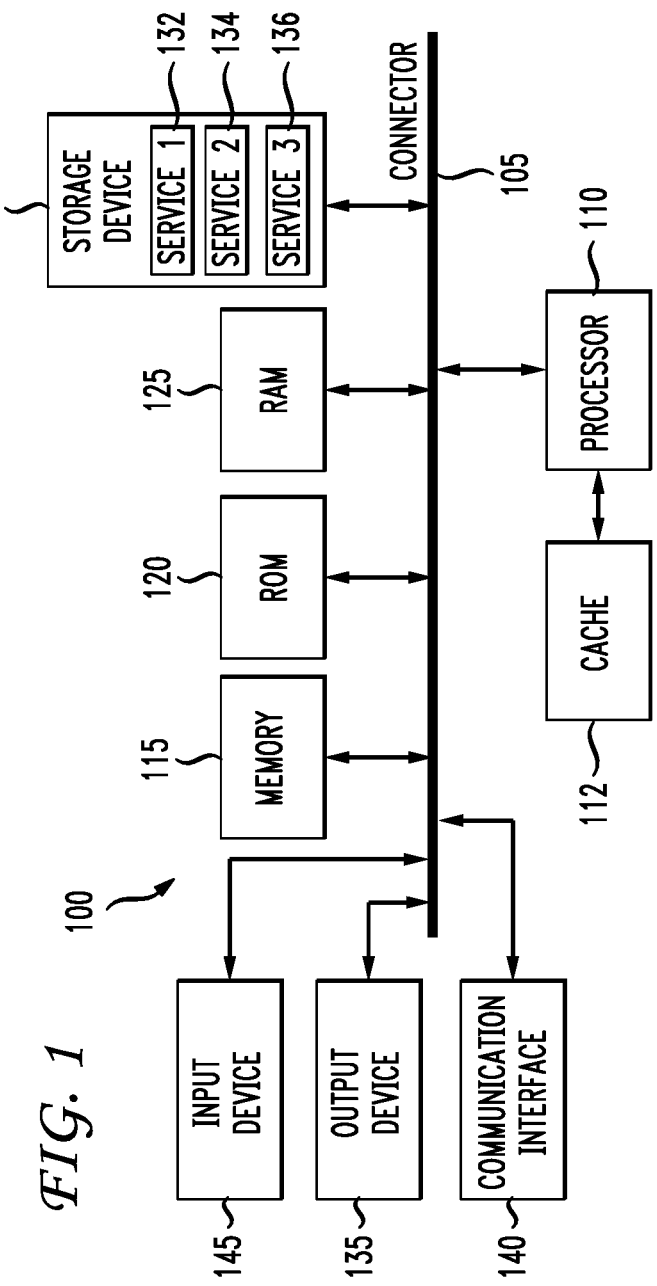
FIG. 1 illustrates an example system configuration.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein. The disclosure generally deals with improvements for transmitting TCP data over a wireless communication channel such that higher throughput can be realized for TCP data transmitted over a wireless channel. The concept could apply to data transmission between any two data streams having different protocols. In one aspect, the functionality disclosed herein can be performed by a "fastACK agent" that operates on an access point to perform the steps disclosed herein. The functionality can also be performed on other devices or across multiple devices as well.

An example method includes treating, at an access point, a data flow between a first station and a second station during a first period of time as a non-fast flow. After a condition is met, the method includes marking the data flow as a fast flow during a second period of time and, during the second period of time, storing data frames in the data flow at the access point to yield stored data frames. The data frames can also be stored in any other device as well. Next, the method includes generating a spoofed TCP acknowledgment signal on behalf of the first station and associated with the stored data frames and transmitting the spoofed TCP acknowledge signal to the second station. The second station then will continue to transmit further data rather than needing to wait for the true TCP ACK. The approach can improve the interaction between 802.11 wireless and TCP streams by reducing the perceived packet latency viewed from the standpoint of the sender and can improve aggregating packets into a frame for transmission over the air interface.

Another aspect of this disclosure includes handling a device roaming from one access point to another. The method according to this aspect can include treating, at an access point, a data flow between a first station and a second station during a first period of time as a non-fast flow. After a condition is met, the method includes marking the data flow as a fast flow during a second period of time. The method includes, during the second period of time, storing data frames in the data flow at the access point to yield stored data frames, generating a spoofed TCP acknowledgment signal on behalf of the first station and associated with the stored data frames and transmitting the spoofed TCP acknowledge signal to the second station. When the first station roams from the access point to a second access point, the method includes transferring a state from the access point to the second access point and transferring at least a portion of the stored data frames from the access point to the second access point. Stored data can also be transferred from the first access point to the second access point. In this manner, if the stored data is needed because of packet loss, it can be accessed from the second access point.

DETAILED DESCRIPTION

The present disclosure addresses the issues raised above. The disclosure provides a system, method and computer-readable storage device embodiments. First a general example system shall be disclosed in FIG. 1 which can provide some basic hardware components making up a server, node or other computer system.

FIG. 1 illustrates a computing system architecture 100 wherein the components of the system are in electrical communication with each other using a connector 105. Exemplary system 100 includes a processing unit (CPU or processor) 110 and a system connector 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules/services can control or be configured to control the processor 110 to perform various actions. Other system memory 115 may be available for use as well. The memory 115 can include multiple different types of memory with different performance characteristics. The processor 110 can include any general purpose processor and a hardware module or software module/service, such as service 1 132, service 2 134, and service 3 136 stored in storage device 130, configured to control the processor 110 as well as a special-purpose processor where software instructions are incorporated into the actual processor design. The processor 110 may essentially be a completely self-contained computing system, containing multiple cores or processors, a bus (connector), memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software services 132, 134, 136 for controlling the processor 110. Other hardware or software modules/services are contemplated. The storage device 130 can be connected to the system connector 105. In one aspect, a hardware module that performs a particular function can include the software component stored in a computer-readable medium in connection with the necessary hardware components, such as the processor 110, connector 105, display 135, and so forth, to carry out the function.

Figure 2:
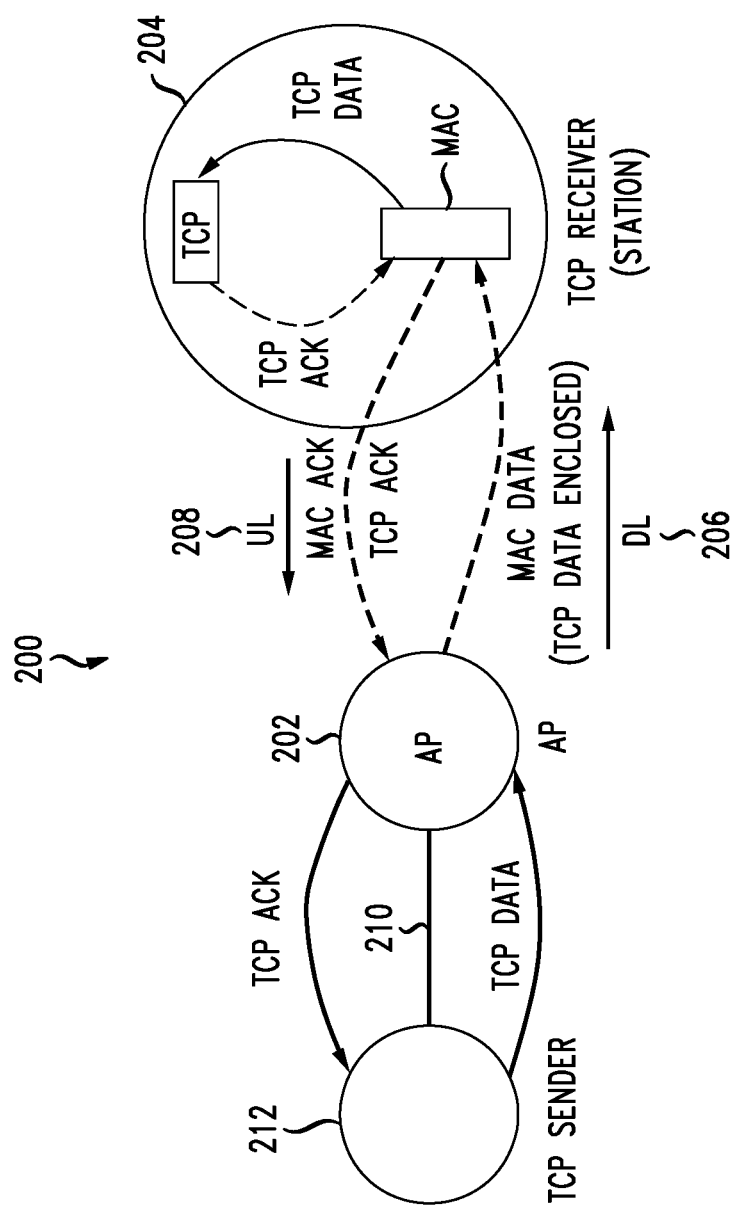
FIG. 2 illustrates a basic uplink and downlink connection between a mobile device and an access point.

Having introduced the basic computing components which can be applicable to embodiments associated with this disclosure, the disclosure now turn to the specific details of the improvements disclosed herein. FIG. 2 illustrates the basic configuration 200 an 802.11 wireless communication structure between a mobile device 204 and an access point 202. The device 204 can be called a "client" or a station (STA) as well, and does not have to be mobile but can be a station computing device. Any device with wireless communication capability can be utilized as the device 204. The access point 202 provides packet or data flows on a backbone 210 for communication with one or more computing devices such as device 212. The uplink 208 generally defines data flowing from the mobile device 204 to the access point 202, the data being directed to the computing device 212, or any other device on the backbone 210. The downlink 206 generally defines TCP data flowing from the device 212 through the access point 202 to the mobile device 204 over the wireless interface.

When device 212 transmits TCP data over the AP 202 to the mobile device 204, there are several acknowledgments that occur. The AP 202 receives the data from the device 212 and generates MAC data which encloses the TCP data. The MAC data is transmitted from the AP 202 to the device 204 over the wireless interface using, in this example, the 802.11 protocol. Other protocols such as BlueTooth, a cellular protocol, or any other wireless or wired protocol could apply as well. The MAC layer on the device 204 will transmit a MAC ACK to acknowledge receipt of the MAC data to the AP 202. The MAC ACK comes back right away and does not require the use of the contention policies for gaining access to the radio link. The TCP data is communicated to the TCP layer of the device 204 which provides a TCP ACK, which, after the device gains access to the radio link via a contention round, is communicated over the wireless interface to the AP 202 and communicated to the device 212.

The AP 202 provides the TCP ACK signal to device 212 to confirm receipt of the TCP data. When the TCP sender 212 receives the TCP ACK, it will then know it can transmit more data. The present disclosure takes advantage of the MAC ACK immediate acknowledgment recognizing that it does not introduce the same kind of latency as the TCP ACK does. Further, the disclosure recognizes that when a MAC ACK is received, the MAC ACK guarantees that the data that was received at the 802.11 MAC layer. There is a high probability that the data was successfully delivered to the TCP stack at device 204.

The TCP layer generates a TCP ACK that is also transmitted over the wireless interface to the access point 202, but only after the device 204 gains access of the radio link through contention rounds with other devices who are also seeking to access the radio link. Once the device gains access to the radio link, it can transmit the TCP ACK over the radio link to the AP 202, which forwards the TCK ACK to the TCP sender 212. While the device 212 has sent some TCP data, it must wait for the TCP ACK from the receiving device 204. The device 204 must take the time to contend for the wireless channel in order to send the TCP ACK. The device 212 is just waiting to send more data during this time period. The time between when a packet was sent by a sending device 212 and when the TCP acknowledgment for that packet is received is called end-to-end latency. This process and the end-to-end TCP latency occurring on each device slow down the throughput. The TCP ACK function operates differently than the MAC ACK function in that the TCP ACK will be sent for every one, two or other number of packets received at the TCP layer independent of how those packets may have been aggregated for wireless transmission. For example, if twenty packets were generated by sender 212 for transmission and the 20 packets are aggregated into one frame and transmitted over the network, the recipient device 204 may send back 20 TCP ACKs (one for each packet), or ten TCP ACKs (one for every two packets), or perhaps a single TCP ACK (one for the group of twenty packets). The device 204 will need to contend for the radio link to send each TCP ACK.

Figure 3:
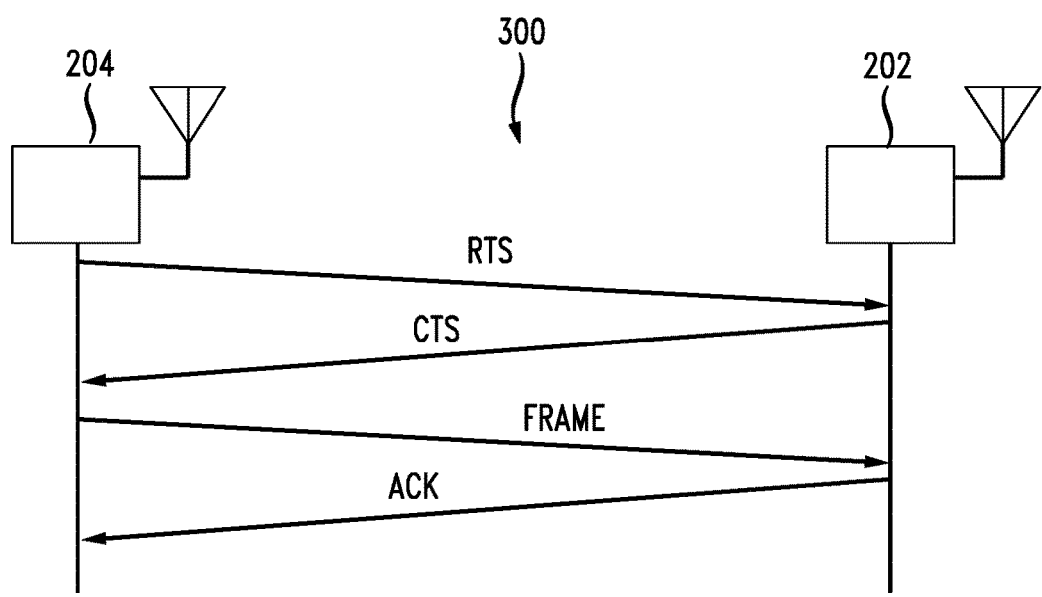
FIG. 3 illustrates basic signaling between a mobile device and an access point.

FIG. 3 illustrates some of the basic signaling 300 between device 204 and access point 202. As noted above, when device 204 desires to send data to device 212 through the access point 202, it must gain access to the wireless medium or radio link. Device 204 transmits a request to send (RTS) signal to the access point 202 which, if the channel is available, will send a clear to send (CTS) signal indicating that the device 204 can send data over the radio link. Following the rules for grabbing the radio link and sending data can avoid frame collisions introduced by what is called the hidden node problem. The hidden node problem occurs when a node is visible from the access point 202 but not from other nodes communicating with the same access point 202. This can lead to difficulties in the media access control (MAC) sublayer. Once the device 204 is clear to send data on the radio link, it will transmit a TCP ACK and a frame or frames of data to AP 202. The device 204 may also aggregate packets into a single frame to provide more efficient transmission of data over the radio link. TCP sending device 212 sends TCP data when it receives the TCP ACK. An increase in TCP latency results in slower release of the data from the TCP sender 212. This in turn reduces the aggregate-able data available for the AP 202. As a result, the AP 202 sends out small aggregates to the STA 204, which results in reduced efficiency at the radio link. TCP relies on the ACK signals to estimate how quickly a sender can transmit additional data without loss and treats packet latency as an indicator for loss.

Figure 4:
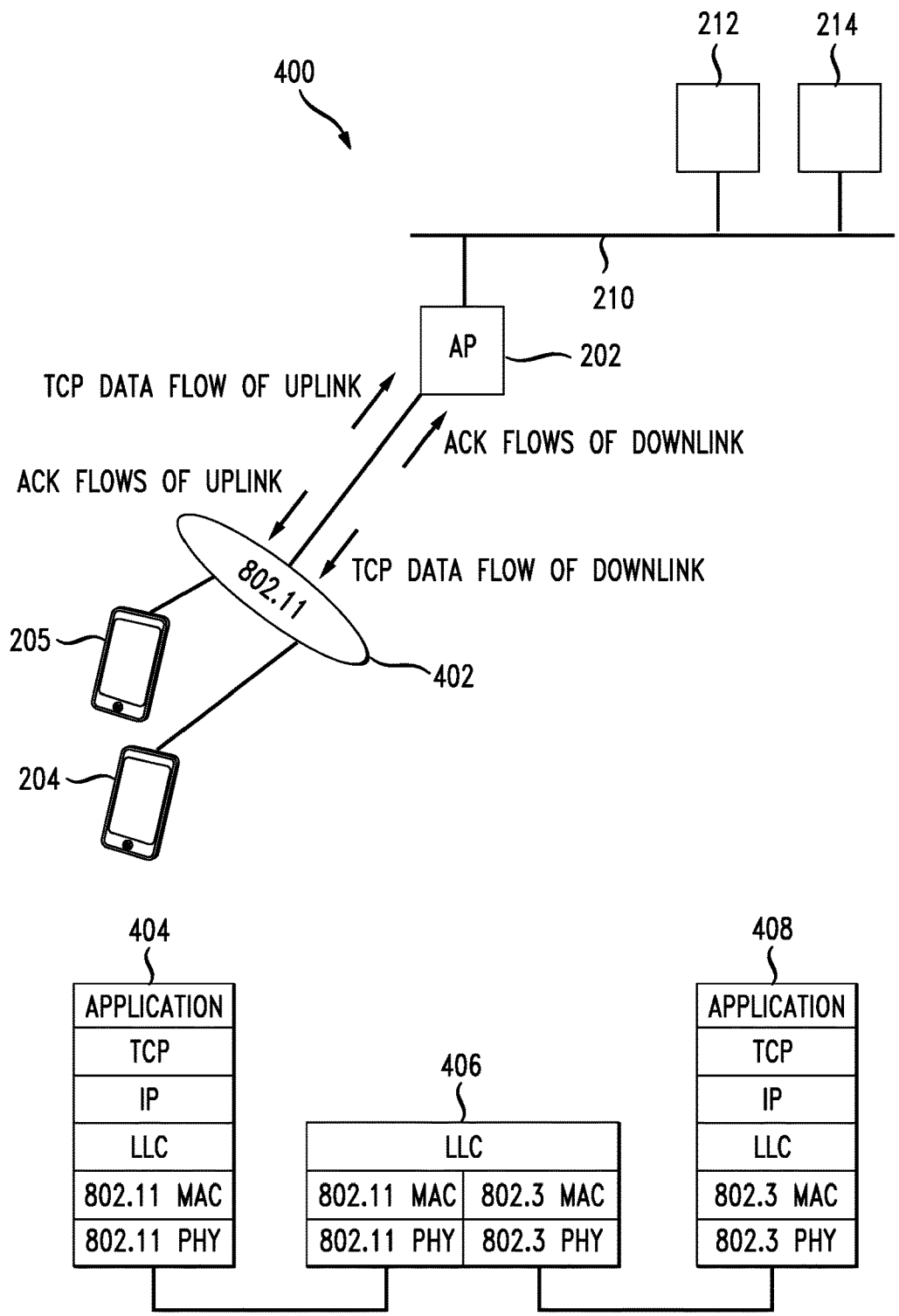
FIG. 4 illustrates the OSI stack in signaling protocols between the mobile device and another device communicating with the mobile device.

The example in FIG. 2 illustrated data transmitted from device 212 to a mobile device 204. FIG. 4 also illustrates the flow of packets in the other direction from the device 204 through the 802.11 wireless network 402 to the access point 202, and through the backbone 210 to a receiving device 212 or 214. Also illustrated are the open systems interconnection (OSI) model that characterizes and standardizes the communication functions of each of the mobile devices 204, 205, the access point 202, and devices 212 and 214. The OSI model stack 404 for the mobile devices 204, 205 includes an application layer, a TCP layer which is also been called a transport layer that provides a function of reliable transmission of data segments between points on a network and includes the function of segmentation, acknowledgment and multiplexing. This disclosure focuses on the acknowledgment component of the TCP layer and the acknowledgement function of the media access control (MAC) layer. The Internet Protocol (IP) layer is the principal communications protocol for the Internet and enables networking across the Internet. The Internet Protocol defines packet structures that encapsulate the data to be delivered. A logical link control (LLC) layer is also shown that is a communication protocol layer that is concerned with managing traffic flow and error control over the physical medium. The MAC layer is also shown, which is a lower sublayer of the data link layer of the OSI model. The MAC sublayer provides addressing and general access control mechanisms that make it possible for several terminals or network nodes to communicate with the multiple access network that incorporates a shared medium, such as an Ethernet network. Finally, the physical layer (PHY) is the first and lowest layer which consists of the networking hardware transmission technologies of the network. It is the basic layer that underlies the logical data structures of the higher level functions in the network and is designated as the PHY layer. The MAC layer and the PHY layer are shown in FIG. 4 as 802.11 protocol-based layers because one aspect of this disclosure relates to the 802.11 wireless protocol. However, it is noted that that particular protocol is only used by way of example, and other protocols could be implemented as well, whether wireless or not.

The access point 202 provides an LLC link layer control layer 406 and a translation of data received from device 204 in the 802.11 MAC protocol to the 802.3 MAC protocol for transmission over the Ethernet network to device 212 or 214. The 802.3 protocol is the standard specification Ethernet, which is a method of physical communication in a local area network. The 802.3 protocol specifies the physical media and the working characteristics of the Internet. Thus, packets or frames that are received from an 802.11 wireless connection first received by the access point 202 at the 802.11 physical layer and are converted from an 802.11 MAC layer into an 802.3 Ethernet protocol for transmission from an 802.11 physical layer across the Ethernet backbone 210 to respective devices 212 or 214.

When data from device 212 is transmitted by the access point 202 to the mobile device 204, two ACKs will be generated by the device 204. One ACK will be produced at the MAC layer 404 and another ACK at the TCP layer 404. The TCP ACK is not necessarily needed in principle, since the MAC ACK confirms that the TCP data has been received by the device 204. In 802.11, the header and other MAC layer overhead are considerable. Even though the payload of a TCP ACK is small, the corresponding MAC data frame for the TCP ACK can use a considerable amount of airtime.

The present disclosure relates to modifying the acknowledgment process for received data. Assume the device 204 is communicating TCP data on the uplink to the access point 202, over the backbone 210 and to the device 212. The TCP layer associated with the device 212, shown in table 408, will generate the ACK for that data. The ACK for the data is generated when implementing a SYN-SYN/ACK handshake. Otherwise, this step is optional as the device 212 can start sending TCP data to device 204 right after the SYN-SYN/ACK handshake without generating the ACK. The acknowledgment will be transmitted from device 212, to the access point 202, and down to device 204. The access point will contend for use of the radio link to send the TCP ACK.

The device 212 may then respond with data to be transmitted to the device 204. In another aspect, device 212 does not have to wait for device 204 to initiate a data transmission. The device 212 will transmit a TCP data flow over the backbone 210, and through the access point 202 on the wireless downlink to device 204. The MAC layer on the device 204 will transmit a MAC ACK that the TCP data flow was received (without the need of contending for the channel), and the TCP layer 404 functioning on device 204 will also transmit a TCP ACK of the TCP data to the access point 202 for transmission over the backbone 210 to the device 212. Given the access control rules described above, in which device 204 must contend for access to the radio link in order to transmit its ACK or ACKs to device 212, irregular latency can be related to when the TCP ACK(s) can be sent to the device 212.

The present disclosure improves the interaction between 802.11 wireless streams and TCP streams and can increase the performance by roughly 30% in a test case with twenty clients communicating with an access point 202. The process reduces the perceived packet latency at the sender (device 212 in the above example) and improves the aggregation of data into frames or efficiency over the air. Other benefits of the disclosed approach include that it does not waste airtime with quiet periods and avoids making adjustments based on heuristics about wireless medium access. Another benefit is that it requires no modification of the end hosts. Only a software patch on the AP (202) is required for this mechanism. The approach prefers using a soft proxy for existing TCP clocking mechanisms. Other issues that are dealt with include how to handle packets dropped between the client 802.11 and TCP stacks, as well as receiver window tuning based on outstanding packets. TCP hole detection, excessive retransmission and roaming behavior, and enterprise networks are also addressed.

The basic description of the disclosed concept will apply in the context of a "downstream" TCP data flow from device 212, through the access point 202 to device 204. Rather than waiting for the device 204 to gain access to the 802.11 channel and transmit the TCP ACK signal once the device 204 receives the TCP data, the access point 202 acts as a TCP soft proxy that, based on a frame or frames of data it receives from device 212 and transmits over the 802.11 interface directed to device 204, and based on the MAC ACK received from the device 204, proactively sends a TCP ACK upstream to the device 212. The approach of proactively sending a spoofed TCP ACK upstream from the access point 202 to device 212 is based on the assumption that if the device 204 stack 404 acknowledges a wireless frame via the MAC ACK, the device 204 will always pass the de-aggregated packets to the device 204 TCP stack 404. The probability of successful delivery of data to TCP stack at device 204 is high. When the access point 202 later detects the real TCP ACK for the downstream TCP data from the device 204, which requires the device 204 to contend for the radio link to be able to send the TCP ACK, the real ACK will be a duplicate ACK generated by the TCP stack 404 in the device 204. This is not always the case, and the disclosure will deal with that caveat. The access point 202 will "consume" the duplicate TCP ACK meaning that it will not forward the ACK on to the device 212 but will store, delete or otherwise dispose of the ACK and make any state changes necessary to confirm that the ACK was received.

The result of sending the spoofed TCP ACK to the device 212 is that the device 212 into will send another set of TCP data to the access point 202, even though it has not yet received the real TCP ACK. The access point 202 can have queues or caches of TCP data that store a sufficient amount of data so as to maximize the aggregation capability when the channel is available for transmitting the additional cached data to the device 204. This process can increase efficiency.

Initially, all flows are treated as non-fast flows and pass between the uplink and the wireless downlink unmodified. The access point 202 or the system may define different standards for processing packet flows between a fast TCP flow and a non-fast TCP flow. If the flow is a media flow, the media flow may be defined as a fast TCP flow which can have different parameters for controlling congestion, establishing priorities for the flow or users, or other issues within the network that can slow down the flow. Treating the flows as non-fast flows means that the TCP ACKs from the device 204 depend on the device 204 generating and accessing the wireless medium, which introduces irregular latency into the acknowledgement process.

After a condition is met, such as, after some number of bytes, after some number of packets, after some throughput threshold, a change in priority of a device or a user, an arbitrary condition, and so forth, the flow can be marked as "fastACK". In order to save resources, the number of fastACK flows set at any time can be capped or otherwise managed. Once the change in status of the flow is initiated, such that the flow becomes a fastACK flow so that fastACKs will be generated at the access point 202, the networking layer can store the data frames locally (i.e., on the device 204, the device 214 or on the access point 202, depending on what could be considered "local") when it passes the data frames off to the wireless MAC and registers data about completion feedback from the wireless MAC. A "fastACK agent" can operate on the access point 202, unknown to device 214 or device 204, and perform the functions disclosed herein.

In one aspect, the access point 202 will store the TCP data when it receives a MAC ACK from the device 204. In the case where 802.11 transmission is unsuccessful (i.e., no MAC ACK is received), the AP 202 will attempt to retransmit the TCP packet and drop it after all 802.11 transmissions fail, and potentially all later packets in the TCP sequence. In the case of successful 802.11 transmission, and a MAC ACK is received, the networking layer within the access point 202 generates the spoofed TCP ACK on behalf of the device 204 TCP stack 404 and sends the spoofed TCP ACK proactively upstream to the device 212. This removes the variable latency of waiting for the client station 204 to generate the TCP ACK, access the medium, and transmit the ACK.

In the general case, the device 204 will eventually gain access to the radio link (medium) and respond with a real TCP ACK which is transmitted to the access point 202. When the networking layer 406 on the access point 202 generates the spoofed TCP ACK, it will note the TCP data sequence numbers that have been acknowledged by virtue of the MAC ACKs received. When the access point 202 receives the now duplicated real TCP ACK from the device 204, the access point 202 will consume that packet and make other state adjustments internally. "Consuming" the real TCP ACK can mean deleting it without forwarding it on to the device 212, or storing it, or performing some other function. TCP ACKs received from device 204 are not stored on the AP 202, although some state adjustments can be made. Once the TCP ACK is received at the access point 202, the TCP data stored that is associated with that TCP ACK can be deleted as the TCP ACK confirms reception of that series of data by the device 204.

Not all client networking stacks 404 guarantee that 802.11 MAC ACKs will lead to TCP ACKs. This is the reason that the networking layer access point 202 stores full TCP packets in a retransmission cache. In one example, assume that device 212 sends packets 1-10 to the access point 202, which transmits the packets 1-10 over the wireless interface to device 204 and receives the MAC ACK indicating receipt at device 204. The access point 202 transmits a spoofed TCP ACK for packets 1-10 to the device 212, which proceeds to transmit packets 11-20. The access point 202 receives and forwards packets 11-20 over the wireless medium to device 204 and receives the MAC ACK from the MAC layer of device 204. The access point 202 will store in local cache packets 1-20. However, assume that the access point 202 later receives a TCP SACK from device 204 for packets 11-20, but does not receive the TCP SACK from device 204 for packets 1-10. Rather than requesting packets 1-10 from the sender 212, the access point 202 will simply proceed to retrieve packets 1-10 from its local cache and retransmit the packets over the wireless medium to the device 204 and wait to receive the TCP SACK for those packets.

Local retransmissions from the access point 202 to the device 204 are done when the duplicate TCP ACK is not received from the device 204 at the access point 202. The packet(s) is stored in the local cache and are cleared from cache on receiving a TCP ACK from the device 204. The data corresponding to the duplicate ACK is retransmitted from this cache, and so is the data between the sequence number and the data corresponding to all SACK edges is retransmitted, if selective acknowledgments are permitted, indicated in the duplicate ACK. In order to avoid excessive local retransmissions, the system looks at where packets are stored. If and only if the packet is in the local cache and not currently being handled by the wireless driver, the system can do the retransmission.

Selective acknowledgement (SACK) was introduced to fix an inefficiency in the way acknowledgements worked which could require retransmission of not only a lost packet but later packets that are retransmitted but actually were received. The problem was originally addressed by RFC 1072, and more recently by RFC 2018, by introducing the selective acknowledgment (SACK) TCP option. SACKs work by appending to a duplicate acknowledgment packet a TCP option containing a range of noncontiguous data received. In other words, it allows the device 204 to provide a signal that means: "I only have up to packet #1 in order, but I also have received packets #3 and #4". This allows the device to retransmit only the packet(s) that were not received by the client.

TCP ACKs from the device 204 are classified as either duplicate or regular and each different type are treated differently. Duplicate means that the sequence and window size is the same as the previously-received ACK. In this case, the system retransmits TCP segments from the sequence number to the selective ACK left edge and the type of service (TOS) bits are modified to prioritize transmission to the device 204. If the requested segment does not exist locally, the ACK is forwarded to force end-to-end retransmission. In the case of regular ACKs, the system simply updates the local state, including the last sequence number that has been processed.

FastACKs are only sent if all preceding TCP sequence numbers for the TCP flow are 802.11 acknowledged (i.e., MAC ACKs received) and the last successful fastACK sequence number is recorded. A receive window is an advertisement by the receiving device, such as device 204, that indicates how much space the device has in its buffers, or basically how much data the device can receive. This disclosure also includes the concept of adjusting the window size based on the number of outstanding bytes, specifically by subtracting the difference between the highest sequence number seen and the highest acknowledged by fastACK or regular TCP ACK (the outstanding bites). Typically a TCP ACK will include a specification of a receiving window or how many bytes the device can receive. The issue raised by generating the spoofed TCP ACK disclosed herein is that the sender 212 and the recipient device 204 will have different views of each other. The modifications disclosed herein will cause the sender 212 to be ahead of device 204 in terms of data flow. A receive window advertised by device 204 is received at the access point 202. Assume by way of example, that the receive window advertised by the device 204 indicates that it has the capability of receiving 100 kB of data. Assume also that the access point 202 has 200 kB of data to send to device 204. The receive window can be updated by a fastACK agent on the access point 202 in two cases. It is set to 0 when the number of outstanding bytes in the local cache exceeds the window advertised by the device 204. The modified received window is then communicated to device 214. In the above scenario, device 214 will be given a window size of zero and not transmit more packets at that time.

In another scenario, assume that the access point 202 local cache has 50 kB of data to send to device 204. When the system receives a TCP ACK from the device 204, the number of outstanding packets in the local cache (50 kB) can be subtracted from the advertised window (100 kB). The resulting modified window size of 50 kB is communicated to device 214 so that it knows to send 50 kB in his next transmission. In this regard, the fastACK agent on the access point 202 can continually modify and adjust the receive window for device 204 in order to smooth the data flow between the sending device 214 in the receiving device 204. Then device 214 will not overwhelm the device 204 with too much data. The process of receiving a window size for a recipient device, modifying the window size, and forwarding the modified window size to a sender device, can be performed at the access point 202 by a fastACK agent or at any other device. The agent can also adjust the window size based on other factors as well. For example, if bandwidth is going to become available shortly or other predicted changes might be estimated to occur which can increase or decrease the amount of data that the sender device should send, the window size can be further adjusted based on one or more other factors and reported to the sending device.

Occasionally, holes in the TCP sequence appear. There are number of scenarios in which a TCP data stream can lose packets between the device 214 and the access point 202. The lost packets in the TCP data are called holes. In order to avoid disrupting the TCP stream state, fastACK is disabled, in one aspect, when a hole is detected. In another aspect, a window size can be adjusted when a hole is detected. The access point 202 keeps track of the sequence of packets received from device 214. Each packet is in sequence. When the current sequence number is greater than the last sequence number plus the payload length, a hole is detected. The access point knows that the missing packets can only come from the device 214. Disabling the fastACK agent avoids fastACKing for data that does not yet exist in the local cache. As an alternate enhancement, the networking layer can send a duplicate ACK on behalf of the STA to force an end-to-end retransmission from the upstream TCP sender. The ACK would inform device 214 that certain packets were not received and that it should resend. In this case, detected holes must be recorded in the networking layer and removed from tracking when a TCP ACK from the device 204 is received.

If RFC 1323 TCP timestamps are enabled, they can be adjusted by the fastACK mechanism since the fastACK agent can indicate when the 802.11 MAC ACK was received, not the client TCP ACK. The timestamps are in the packet and improve the efficiency of TCP. Device 214 can transmit a packet with a timestamp. When device 204 returns data to device 214, it can include its local timestamp. Device 214 evaluates the timestamp from device 204, and based on that, device 214 can get a sense from this echo signal of the round trip time for the data and response. Both devices can adjust their receive windows which provides an indication of how much data that they can receive. When a fastACK agent is operating, neither device 214 nor device 204 is aware of the fastACK agents and its functions and thus these timestamps can give an incorrect view of their status. The timestamps are not an accurate record of round trip time in this scenario. Thus, the fastACK can disable the timestamp feature. This would solve the problem of inaccurate timestamp data. In another aspect, the fastACK agent can impersonate device 204's timestamps to be more accurate. It could remove the provided timestamp and replace it with one that is more accurate given the fastACK functionality.

In some cases, a timer is set where if an ACK is not received by the sending device 214, it retransmits data automatically.

Figure 5:
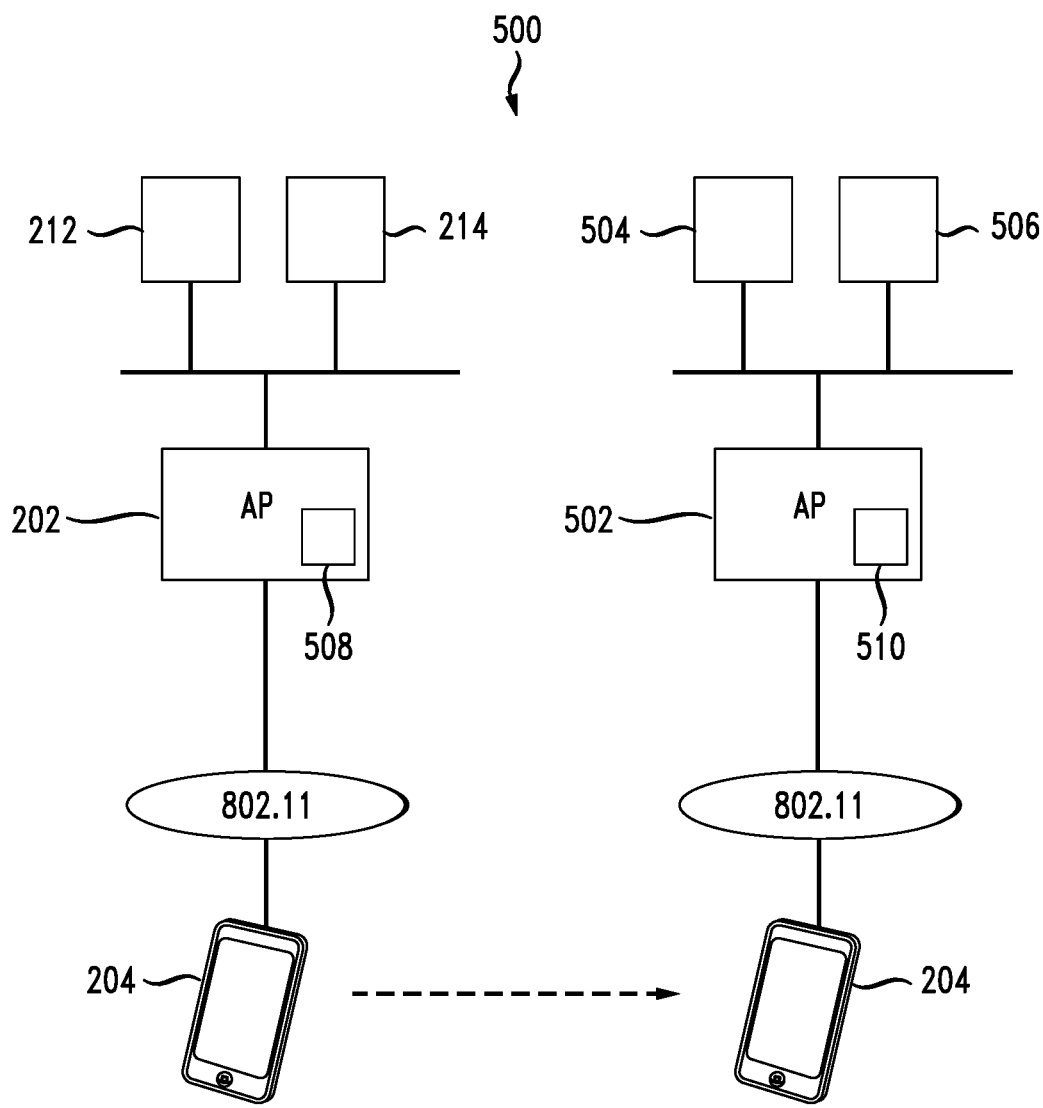
FIG. 5 illustrates a handoff of a device from one network to another.

FIG. 5 illustrates a scenario where the device 204 roams between a first access point 202 and a second access point 502. As the device 204 roams, the state from the first access point 202, represented as feature 508, can be transferred from the roam-from access point 202 to the roam-to access point 502. In the case of a controller based access point, the state 508 can remain on the controller. In the case of a cloud-based, smart radio access point, there is an existing mechanism to indicate that a roam has been incurred for the particular device 204. The roam-to access point 502 sends a broadcast indicating the device 204 and the roam-to access point 502 identity. In the presence of TCP fastACK, when the room-from access point 202 receives this, it must now, in addition to previous behavior, relay the stored TCP data frames for that device 204 to the uplink for storage 510 on the roam-to access point 502. Since the roaming signal updates a switch state, those packets can be marked as remote and be sent to the uplink based on existing TCP timers or duplicate acknowledgments, which will route them to the correct roam-to access point 502 and therefore available for use for the device 204. An alternate is to flush the existing state by signaling the roam-to access point 502 and then sending the locally cached data frames 508 to access point 502.

Other approaches could be used as well. For example, a packet sequence stored on the device could be reported to the sending device (212 or 204), and once the device 204 has roamed to the new access point 502, the data could be retransmitted if possible to store in the cache 510 of AP 502.

Figure 6:
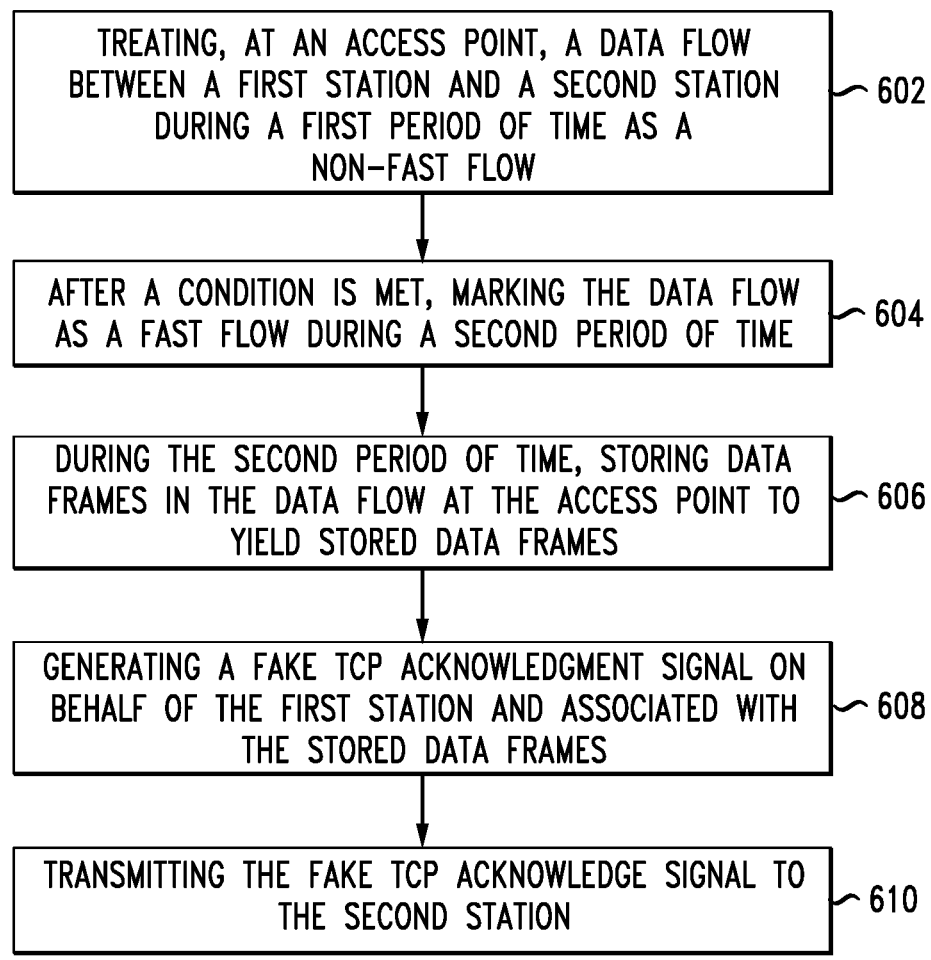
FIG. 6 illustrates a method embodiment.

FIG. 6 presents an example method embodiment of this disclosure. The method can be performed by a fastACK agent on an access point. The method includes treating, at an access point, a data flow between a first station and a second station during a first period of time as a non-fast flow (602). After a condition is met, the method includes marking the data flow as a fastACK flow during a second period of time (604). The method further includes, during the second period of time, storing data frames in the data flow at the access point to yield stored data frames (606), generating a spoofed TCP acknowledgment signal on behalf of the first station and associated with the stored data frames (608) and transmitting the spoofed TCP acknowledge signal to the second station (610).

The method can further include recording TCP sequence numbers that have been acknowledged (via a MAC ACK) in connection with the stored data frames and receiving and consuming a true TCP acknowledgment signal from the first station for the stored data frames. In another aspect, the method can include making a state adjustment for the access point, the state adjustment being associated with the receiving and consuming of the true TCP acknowledgment signal. A further feature can include clearing the stored data frames upon receiving the true TCP acknowledgment signal. The method can further include receiving and consuming the true TCP acknowledgment signal if the true TCP acknowledgment signal is a last packet and aggregated 802.11 frame.

In another aspect, the method of can include classifying TCP acknowledgment signals from the first station is either a duplicate TCP acknowledgment signal or a regular TCP acknowledgment signal, wherein the duplicate TCP acknowledgment signal is associated with an acknowledgment for a same set of frames for which the spoofed TCP acknowledgment signal was generated. In addition, the method can include treating the duplicate TCP acknowledgment signal differently than the regular TCP acknowledgment signal. Furthermore, the method can include adjusting a first window size associated with the first period of time to a second window size associated with the second period of time based on a number of outstanding bytes.

Figure 7:
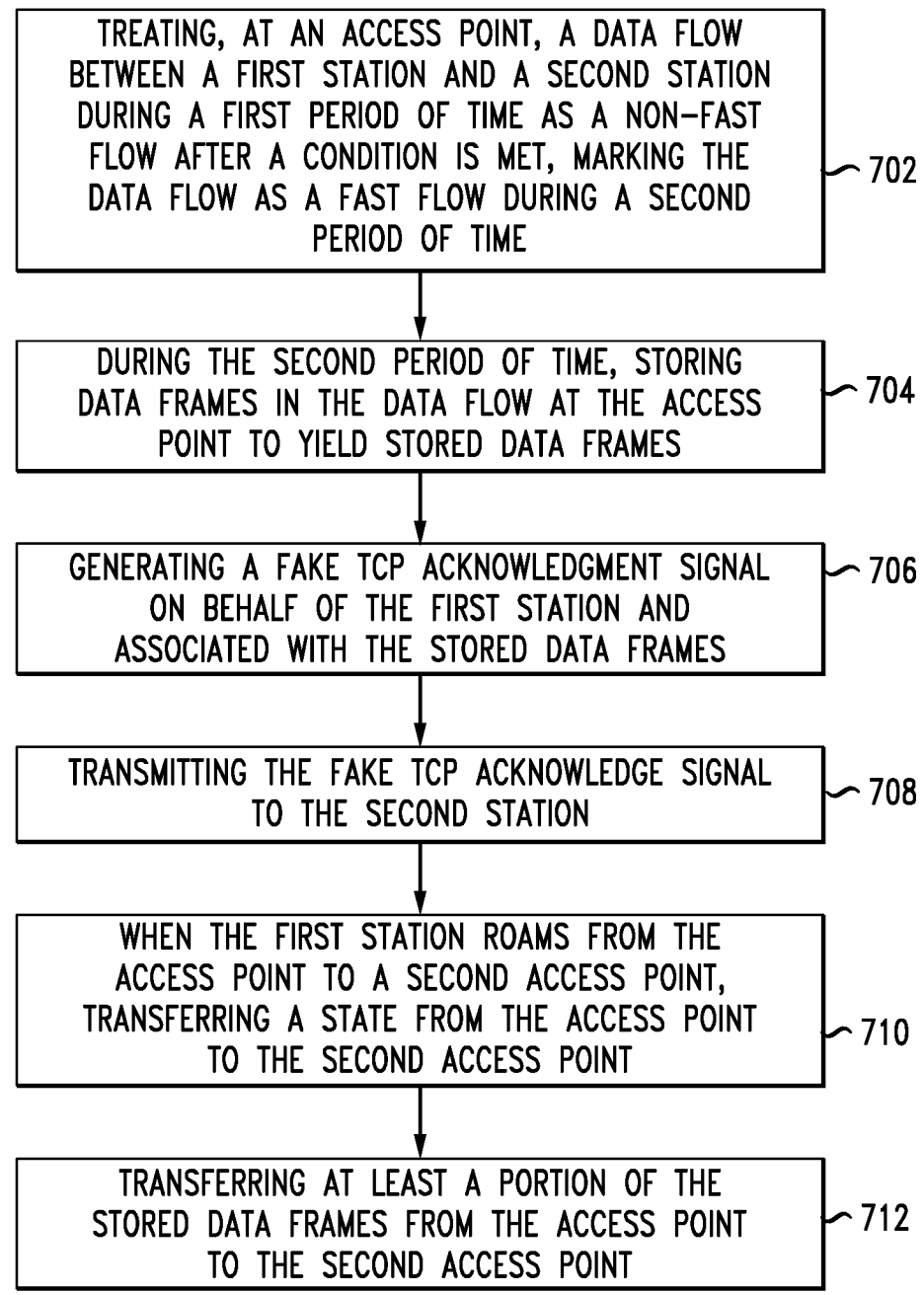
FIG. 7 illustrates another method embodiment.

When the first station is handed off to a second access point, the method disclosed in FIG. 7 can be implemented to ensure that the benefits of the disclosure set forth above applies for handoff decisions from one access point to another. In this regard, the method can include treating, at an access point, a data flow between a first station and a second station during a first period of time as a non-fast flow and after a condition is met, marking the data flow as a fastACK flow during a second period of time (702). The method includes, during the second period of time, storing data frames in the data flow at the access point to yield stored data frames (704), generating a spoofed TCP acknowledgment signal on behalf of the first station and associated with the stored data frames (706) and transmitting the spoofed TCP acknowledge signal to the second station (708). When the first station roams from the access point to a second access point, transferring a state from the access point to the second access point (710) and transferring at least a portion of the stored data frames from the access point to the second access point (712).

In this way, once the device transitions to the second access point, if a retransmission of TCP data needs to occur, the second access point can utilize the received store data frames for the retransmission. The amount of the data that is stored in the cache that can be communicated can be chosen based on a number of factors. For example, a period of time the data was stored, historical use of such data by the user, additional input from the user, data from social networking which provides information on how to handle the communication of the data within the cache of the access point, user priority, data priority, and so forth. Any such data can be utilized to select an amount of stored data in the cash to transition to the second access point. For example, a user may have already retrieved or viewed some of the stored data and half of it remains. Such a scenario could result in only the unviewed portion of the data being communicated from the first access point to the second access point.

In some embodiments the computer-readable storage devices, mediums, and/or memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other. For example, while some specific protocols such as 802.11 and 802.3 are mentioned in the examples above, the principles could apply to any communication protocol and does not have to be limited to these particular protocols. Any configuration in which received data is acknowledged through an ACK signal could implement the concepts disclosed herein.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

What is claimed is:

1. A method comprising:
    treating, at an access point, a data flow between a first station and a second station during a first period of time as a non-fast flow;
    after a condition is met, marking the data flow as a fastACK flow during a second period of time;
    during the second period of time, storing data frames in the data flow at the access point to yield stored data frames;

generating a spoofed TCP acknowledgment signal on behalf of the first station and associated with the stored data frames; and transmitting the spoofed TCP acknowledge signal to the second station.

2. The method of claim 1, further comprising:

recording TCP sequence numbers that have been acknowledged in connection with the stored data frames.

3. The method of claim 2, further comprising:

receiving and consuming a true TCP acknowledgment signal from the first station for the stored data frames.

4. The method of claim 3, further comprising:

making a state adjustment for the access point, the state adjustment being associated with the receiving and consuming of the true TCP acknowledgment signal.

5. The method of claim 4, further comprising:

clearing the stored data frames upon receiving the true TCP acknowledgment signal.

6. The method of claim 3, further comprising:

receiving and consuming the true TCP acknowledgment signal if the true TCP acknowledgment signal is a last packet and aggregated 802.11 frame.

7. The method of claim 1, further comprising:

classifying TCP acknowledgment signals from the first station is either a duplicate TCP acknowledgment signal or a regular TCP acknowledgment signal, wherein the duplicate TCP acknowledgment signal is associated with an acknowledgment for a same set of frames for which the spoofed TCP acknowledgment signal was generated.

8. The method of claim 7, further comprising:

treating the duplicate TCP acknowledgment signal differently than the regular TCP acknowledgment signal.

9. The method of claim 1, further comprising, adjusting a first window size associated with the first period of time to a second window size associated with the second period of time based on a number of outstanding bites.

10. The method of claim 1, further comprising:

when the first station is handed off to a second access point:

transferring a state from the access point to the second access point; and transferring at least a portion of the stored data frames from the access point to the second access point.

11. A system comprising:

at least one processor; and a computer-readable storage device storing instructions which, when executed by the at least one processor, cause the at least one processor to perform operations comprising:

treating, at an access point, a data flow between a first station and a second station during a first period of time as a non-fast flow;

after a condition is met, marking the data flow as a fastACK flow during a second period of time;

during the second period of time, storing data frames in the data flow at the access point to yield stored data frames;

generating a spoofed TCP acknowledgment signal on behalf of the first station and associated with the stored data frames; and transmitting the spoofed TCP acknowledge signal to the second station.

12. The system of claim 11, wherein the computer-readable storage device stores additional instructions which, when executed by the at least one processor, cause the at least one processor to perform operations comprising:

recording TCP sequence numbers that have been acknowledged in connection with the stored data frames.

13. The system of claim 12, wherein the computer-readable storage device stores additional instructions which, when executed by the at least one processor, cause the at least one processor to perform operations comprising:

receiving and consuming a true TCP acknowledgment signal from the first station for the stored data frames.

14. The system of claim 13, wherein the computer-readable storage device stores additional instructions which, when executed by the at least one processor, cause the at least one processor to perform operations comprising:

making a state adjustment for the access point, the state adjustment being associated with the receiving and consuming of the true TCP acknowledgment signal.

15. The system of claim 13, wherein the computer-readable storage device stores additional instructions which, when executed by the at least one processor, cause the at least one processor to perform operations comprising:

clearing the stored data frames upon receiving the true TCP acknowledgment signal.

16. The system of claim 13, wherein the computer-readable storage device stores additional instructions which, when executed by the at least one processor, cause the at least one processor to perform operations comprising:

receiving and consuming the true TCP acknowledgment signal if the true TCP acknowledgment signal is a last packet and aggregated 802.11 frame.

17. The system of claim 11, wherein the computer-readable storage device stores additional instructions which, when executed by the at least one processor, cause the at least one processor to perform operations comprising:

classifying TCP acknowledgment signals from the first station is either a duplicate TCP acknowledgment signal or a regular TCP acknowledgment signal, wherein the duplicate TCP acknowledgment signal is associated with an acknowledgment for a same set of frames for which the spoofed TCP acknowledgment signal was generated.

18. A non-transitory computer-readable storage device storing instructions which, when executed by at least one processor, cause the at least one processor to perform operations comprising:

treating, at an access point, a data flow between a first station and a second station during a first period of time as a non-fast flow;

after a condition is met, marking the data flow as a fastACK flow during a second period of time;

during the second period of time, storing data frames in the data flow at the access point to yield stored data frames;

generating a spoofed TCP acknowledgment signal on behalf of the first station and associated with the stored data frames; and transmitting the spoofed TCP acknowledge signal to the second station.

19. The non-transitory computer-readable storage device of claim 18, wherein the non-transitory computer-readable storage device stores additional instructions which, when executed by the at least one processor, cause the at least one processor to perform operations further comprising:

recording TCP sequence numbers that have been acknowledged in connection with the stored data frames.

20. The non-transitory computer-readable storage device of claim 19, wherein the non-transitory computer-readable storage device stores additional instructions which, when executed by the at least one processor, cause the at least one processor to perform operations further comprising:

receiving and consuming a true TCP acknowledgment signal from the first station for the stored data frames.

* * * * *